(12) United States Patent
Wang et al.

(10) Patent No.: US 7,606,145 B2
(45) Date of Patent: Oct. 20, 2009

(54) DUAL-MODE BROADBAND MODEM

(75) Inventors: Jin Wang, Walnut Creek, CA (US);
Canhui Ou, Danville, CA (US);
Richard Dennis Hart, Concord, CA (US); Raghvendra Savoor, Walnut Creek, CA (US); Stephen A. Sposato, Lafayette, CA (US)

(73) Assignee: SBC Knowledge Ventures, L.P., Reno, NV (US)

( * ) Notice: Subject to any disclaimer, the term of this patent is extended or adjusted under 35 U.S.C. 154(b) by 640 days.

(21) Appl. No.: 11/288,927

(22) Filed: Nov. 29, 2005

(65) Prior Publication Data
US 2007/0121640 A1    May 31, 2007

(51) Int. Cl.
*H04L 12/26* (2006.01)
(52) U.S. Cl. .................................. 370/228; 340/825.01
(58) Field of Classification Search ................. 370/225, 370/216, 293; 375/222
See application file for complete search history.

(56) References Cited

U.S. PATENT DOCUMENTS

| | | | |
|---|---|---|---|
| 5,867,480 A * | 2/1999 | Thomas et al. ............... 370/230 |
| 6,002,722 A | 12/1999 | Wu | |
| 6,091,713 A | 7/2000 | Lechleider et al. | |
| 6,181,775 B1 | 1/2001 | Bella | |
| 6,266,348 B1 * | 7/2001 | Gross et al. .................. 370/493 |
| H002059 H * | 2/2003 | Ledsham et al. ............. 455/466 |
| 6,574,308 B1 | 6/2003 | Macdonald et al. | |
| 6,798,769 B1 * | 9/2004 | Farmwald .................... 370/352 |
| 6,904,133 B2 | 6/2005 | Yamano et al. | |
| 7,239,696 B2 * | 7/2007 | Creamer et al. ......... 379/399.01 |
| 2004/0076266 A1 | 4/2004 | Rudolf | |
| 2005/0123028 A1 * | 6/2005 | Cioffi et al. .................. 375/222 |
| 2006/0227940 A1 * | 10/2006 | Ferdosi et al. ........... 379/22.04 |

* cited by examiner

*Primary Examiner*—Kwang B Yao
*Assistant Examiner*—Alex Skripnikov
(74) *Attorney, Agent, or Firm*—Brinks Hofer Gilson & Lione (57) ABSTRACT

A dual-mode broadband modem operative to operate in a service mode and a surveillance mode is disclosed. Generally, the dual-mode broadband modem comprises a primary communication device; a secondary communication device; a central processing unit in communication with the primary and secondary communication devices; and a memory unit in communication with the central processing unit. In the service mode, the primary communication device communicates with a broadband service provider and the central processing unit stores historical information regarding performance of the primary communication device in the memory unit. If an interruption in broadband service is detected, or the performance of the primary communication device falls below a predetermined threshold, the dual-mode broadband modem switches to surveillance mode and the secondary communication device is activated. The secondary communication device communicates with the broadband service provider to send at least a portion of the historical information regarding performance of the primary communication device to the broadband service provider for processing to determine a source of the interruption in broadband service or a source of the decreased performance of the primary communication device.

23 Claims, 7 Drawing Sheets

DUAL-MODE BROADBAND MODEM

BACKGROUND

Broadband internet service such as digital subscriber line ("DSL") service, cable broadband service and fiber-to-the-home service have become popular for residential internet service due to their high data rates. Due to this increasing popularity of residential broadband internet service, it has become more important to develop ways to quickly and efficiently determine the source of an interruption in broadband service. When there is an interruption in broadband service, the broadband modem may lose sync with network equipment of a broadband service provider and it is typically no longer possible to exchange data or coordinate tests between network equipment of the broadband service provider and the broadband modem of a broadband customer.

When an interruption in broadband service occurs, the service provider usually can accurately ascertain the cause of service interruption by measuring loss, noise and impedance at both the service provider side and the customer side. However, due to the fact it is no longer possible to exchange data or coordinate tests between the broadband service provider and the broadband modem of the customer, a technician will normally be dispatched to the customer side to perform so called "double-ended" tests. To save cost and labor, some service providers also troubleshoot broadband service by performing a single-ended metallic loop test at the service provider side, however, such tests are conducted in very low frequency bands and they rarely reveal the cause of the service disruption.

Performing measurements and tests at both the broadband service provider side and the broadband customer side is one reliable way to determine a source of an interruption in broadband service. However, it is also costly and inefficient to send a technician to many broadband service customers in response to interruptions in broadband service. Thus, it is desirable to provide an apparatus and method that can automatically determine the source of an interruption in broadband service without human operation by a technician.

DETAILED DESCRIPTION OF THE DRAWINGS

The present disclosure is directed to a dual-mode broadband modem. To increase efficiency and reduce costs in troubleshooting disruptions in broadband service, the dual-mode broadband modem comprises a primary communication device and a secondary communication device. The secondary communication device allows the broadband service provider to coordinate tests over the primary communication device between the dual-mode broadband modem and the broadband service provider. Additionally, the secondary communication device allows the dual-mode broadband modem to send historical data relating to performance of the primary communication device, compiled during normal operation of the dual-mode broadband modem, to the broadband service provider.

Figure 1:
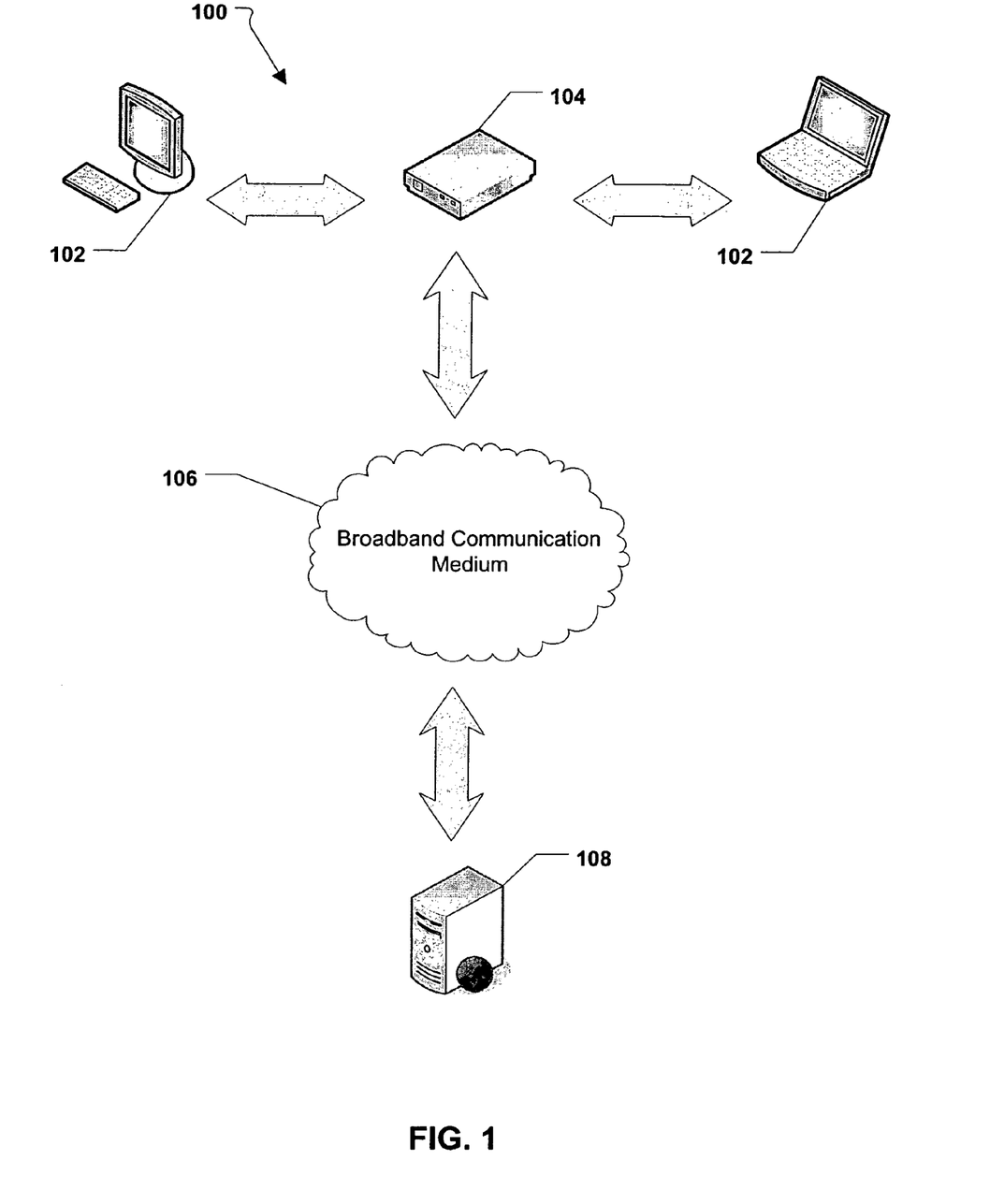
FIG. 1 is an illustrative embodiment of a typical broadband network.

FIG. 1 is a diagram of a typical broadband network 100. Typically, the broadband network 100 comprises at least one user device 102; a dual-mode broadband modem 104 connected to the at least one user device 102; a communication medium 106 connected to the dual-mode broadband modem 104; and a broadband service provider 108 connected to the broadband communication medium 106.

The at least one user device 102 may be a personal computer, a server, a handheld device, or any other type of device operative to communicate over a network. The dual-mode broadband modem 104 may be a dual-mode xDSL modem, a dual-mode cable modem, a dual-mode optical network termination ("ONT"), or any other type of modem capable of providing broadband internet service.

The dual-mode broadband modem 104, as explained in detail below, may operate in a service mode and a surveillance mode. During normal operation in the service mode, the dual-mode broadband modem 104 communicates with the broadband service provider 108 via the communication medium 106 to provide a network connection to the at least one user device 102 as is known in the art. While operating in the service mode, the dual-mode broadband modem 104 collects historical information regarding performance of the dual-mode broadband modem 104 and stores the historical information in the dual-mode broadband modem 104.

If an interruption in broadband service occurs such as the dual-mode broadband modem 104 being unable to sync up with the broadband service provider 108, or the performance of the dual-mode broadband modem falls below a predetermined threshold, the dual-mode broadband modem 104 switches to the surveillance mode. In the surveillance mode, a secondary communication device of the dual-mode broadband modem 104 communicates with the broadband service provider 108 to transmit at least a portion of the historical information regarding historical performance of the dual-mode broadband modem 104 to the broadband service provider 108 for the purpose of determining a source of the interruption in broadband service or a source of the degraded performance. In the surveillance mode, the dual-mode broadband modem 104 may additionally communicate with the broadband service provider 108 via the secondary communication device to coordinate diagnostic tests over the communication medium between the dual-mode broadband modem 104 and the broadband service provider 108 to determine a source of the interruption in broadband service.

Figure 2:
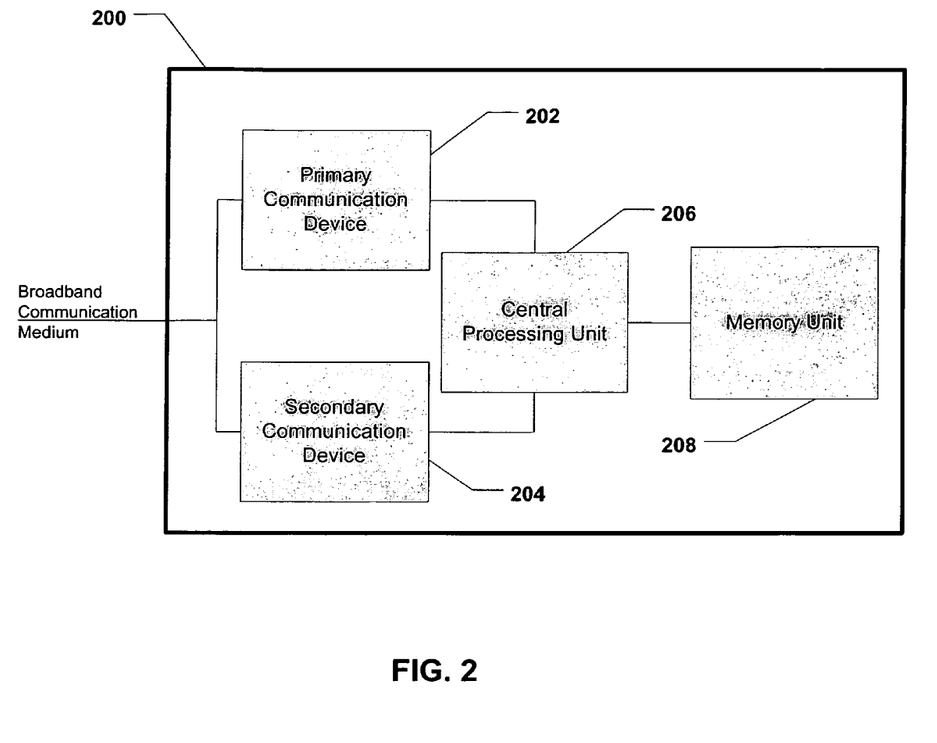
FIG. 2 is a block diagram of one embodiment of a dual-mode broadband modem.

FIG. 2 is block diagram of one embodiment of a dual-mode broadband modem 200. Typically, the dual-mode broadband modem 200 comprises a primary communication device 202 operative to communicate with a broadband service provider using a first network protocol; a secondary communication device 204 operative to communicate with the broadband service provider using a second network protocol; a central processing unit 206 in communication with the first communication device 202 and the secondary communication device 204; and a memory unit 208 in communication with the central processing unit 206.

The central processing unit 206 is operative to switch the dual-mode broadband modem 200 between a service mode and a surveillance mode. Generally, the dual-mode broadband modem 200 operates in the service mode during normal communications between the primary communication device 202 and a broadband service provider, and the dual-mode broadband modem 200 operates in the surveillance mode when there is an interruption in broadband service or the performance of the primary communication device 202 falls below a predetermined threshold. The performance threshold may be any value set by the broadband service provider that is characteristic of unsatisfactory broadband service. During operation in the service mode, the central processing unit 206 activates the primary communication device 202 so that the primary communication device 202 may communicate with the broadband service provider as is known in the art. The primary communication device 202 may be a DSL modem, a cable modem, an ONT, or any other type of broadband modem known in the art.

During communication between the primary communication device 202 and the broadband service provider, the central processing unit 206 monitors performance of the primary communication device 202 and stores historical information relating to performance of the primary communication device 202 in the memory unit 208. The historical information may comprise measurements of wideband loss, loop insertion loss, loop noise, loop impedance, various performance parameters of DSL such as signal-to-noise ratio, maximum attainable bit rate, operation rate, noise margin and code violations, or any other type of information relating to performance of the primary communication device 202 and the broadband communication medium.

If there is an interruption in broadband service such as the primary communication device 202 not being able to sync up with the broadband service provider, or the performance of the primary communication device 202 falls below a predetermined performance threshold, the central processing unit 206 is operative to switch the dual-mode broadband modem 200 from the service mode to the surveillance mode. However, in some embodiments, it may also be possible for a user to direct the central processing unit 206 to switch the dual-mode broadband modem 200 from the service mode to the surveillance mode. While operating in surveillance mode, the central processing unit 206 activates the secondary communication device 204. The secondary communication device 204 may be a voice-band modem; a wireless modem that operates over general packet radio service ("GPRS"), Zigbee, wireless fidelity ("WiFi"), WiMax, or any other type of wireless protocol known in the art; or any other type of non-broadband communication protocol known in the art.

The secondary communication device 204 communicates with the broadband service provider in surveillance mode to determine the source of the interruption of broadband service or the reason for the performance of the primary communication device 220 falling below the predetermined threshold. In one embodiment, the secondary communication device 204 may transfer at least a portion of the historical information collected in service mode to the broadband service provider so that the broadband service provider may process the historical information. The collected information may comprise loop insertion loss, loop noise, loop impedance and various performance parameters of DSL such as signal-to-noise ratio, maximum attainable bit rate, operation rate, noise margin, code violations, or any other parameter regarding the performance of the primary communication device 202 or the broadband communication medium. Generally, the broadband service provider processes the historical information for any trends in the performance of the dual-mode broadband modem over a period of time that would be characteristic of particular sources of interruption in broadband service or characteristic of a reason for reduced performance of the primary communication device 220. For example, if the primary communication device 202 is a DSL modem, the historical information may show a slow degradation in the line caused by a corrosion in the line, or a splice or connection going bad over time. Similarly, the historical information may show a periodic spike in noise in the line corresponding to a periodically occurring outside influence on the line. Using the historical information, the broadband service provider may be able to determine the source of an interruption in broadband service, or the source of the reduced performance of the primary communication device 220, and automatically suggest to the broadband service customer how to alleviate the interruption in broadband service, or increase the performance of the primary communication device 220.

In another embodiment, the secondary communication device 204 may communicate with the broadband service provider to automatically run diagnostic tests between the primary communication device 202 and the broadband service provider. The diagnostic tests may be performed to confirm a source of interruption in broadband service evidenced by the processed historical data or be performed independent of the historical data. For example, if the primary communication device 202 is a DSL modem, the secondary communication device 204 may communicate with a broadband service provider to perform double-ended loop tests such as measurements for wideband loss and noise which require coordination between the primary communication device 202 and the broadband service provider. In one test, the central processing unit 206 may coordinate with the broadband service provider via the secondary communication device 204 for the primary communication device 202 to output one or more test tones in the DSL band with a fixed power. In response, the broadband service provider measures the power of the received one or more test tones to determine what power loss exists between the dual-mode broadband modem 200 and the broadband service provider. In another test, the dual-mode broadband modem 200 may measure a noise spectrum in the DSL band and then transfer the test data back to the broadband service provider via the secondary communication device 204. In yet another test, the dual-mode broadband modem 200 may conduct a time-domain reflectometry (TDR) measurement and then transfer the TDR waveform back to the broadband service provide via the secondary communication device 204. Using the data from these tests, the broadband service provider may be able to determine the source of an interruption in broadband service and automatically suggest a solution to the broadband service customer how alleviate the interruption in broadband service.

In yet another embodiment, the second communication device 204 may be used to perform diagnostic tests that the primary communication device 202 cannot perform. For example, in one test, the central processing unit 206 may direct the primary communication device 202 to take a loss spectrum measurement. If the loss spectrum reveals a bridged-tap that impairs performance, the central processing unit 206 may then direct the secondary communication device 204 to conduct a TDR measurement to determine at which end of the broadband medium the tap impairing performance is located.

In another embodiment the secondary communication device 204 may additionally be used to communicate with an internet service provider to provide internet service to the dual-band broadband modem 200 while the primary communication device 202 cannot communicate with the broadband service provider. For example, if the primary communication device 202 is a DSL modem, cable modem, or ONT, and a disruption in broadband service occurs, the dual-mode broadband modem 200 could use the secondary communication device 204, such as a voice-band modem, to provide internet service to the dual-band broadband modem 200.

Figure 3:
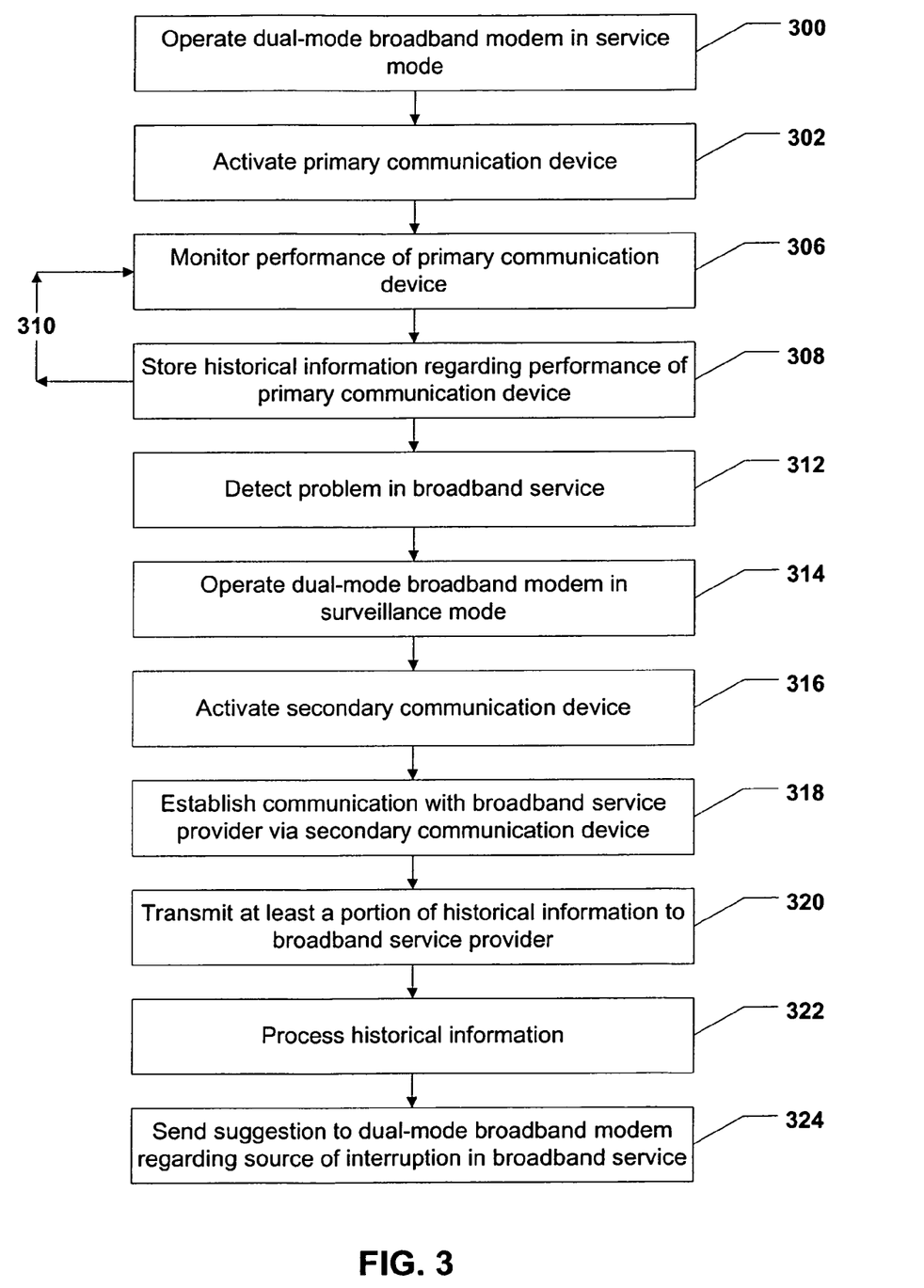
FIG. 3 is a flow chart of one embodiment of a method for using a dual-mode broadband modem to determine the source of an interruption in broadband service or the source of degraded performance of the dual-mode broadband modem.

FIG. 3 is a flow chart of one embodiment of a method for using a dual-mode broadband modem to determine the source of an interruption in broadband service or the source of reduced performance of the dual-mode broadband modem. The method begins at step 300 with the dual-mode broadband modem operating in the service mode. In the service mode, a central processing unit of the dual-mode broadband modem activates a primary communication device of the dual-mode broadband modem 302. Once activated, the primary communication device communicates with a broadband service provider as is known in the art 304. During communication between the primary communication device and the broadband service provider, the central processing unit monitors the performance of the primary communication device 306 and stores historical information relating to the performance of the primary communication device in a memory unit of the dual-mode broadband modem 308. The central processing unit may continue to monitor the performance of the primary communication device and store historical information relating to the performance of the primary communication device 310 until the dual-mode broadband modem detects a problem with communications between the dual-mode broadband modem and the broadband service provider 312 such as the primary communication device not being unable to sync up with the broadband service provider or the performance of the primary communication device falling below a predetermined threshold.

In response to detecting a problem with communication between the dual-mode broadband modem and the broadband service provider, the central processing unit switches the dual-mode broadband modem from a service mode to a surveillance mode 314. Once in surveillance mode, the central processing unit activates a secondary communication device 316. The secondary communication device establishes communications with the broadband service provider 318 and transmits at least a portion of the historical information stored in the memory unit to the broadband service provider for processing 320. The broadband service provider may process the historical information to determine a source of the interruption in broadband service or a source of degraded performance of the primary communication device 322, and automatically send a suggestion to the dual-mode broadband modem regarding how to alleviate the source of the interruption in broadband service or increase performance of the primary communication device 324.

Figure 4:
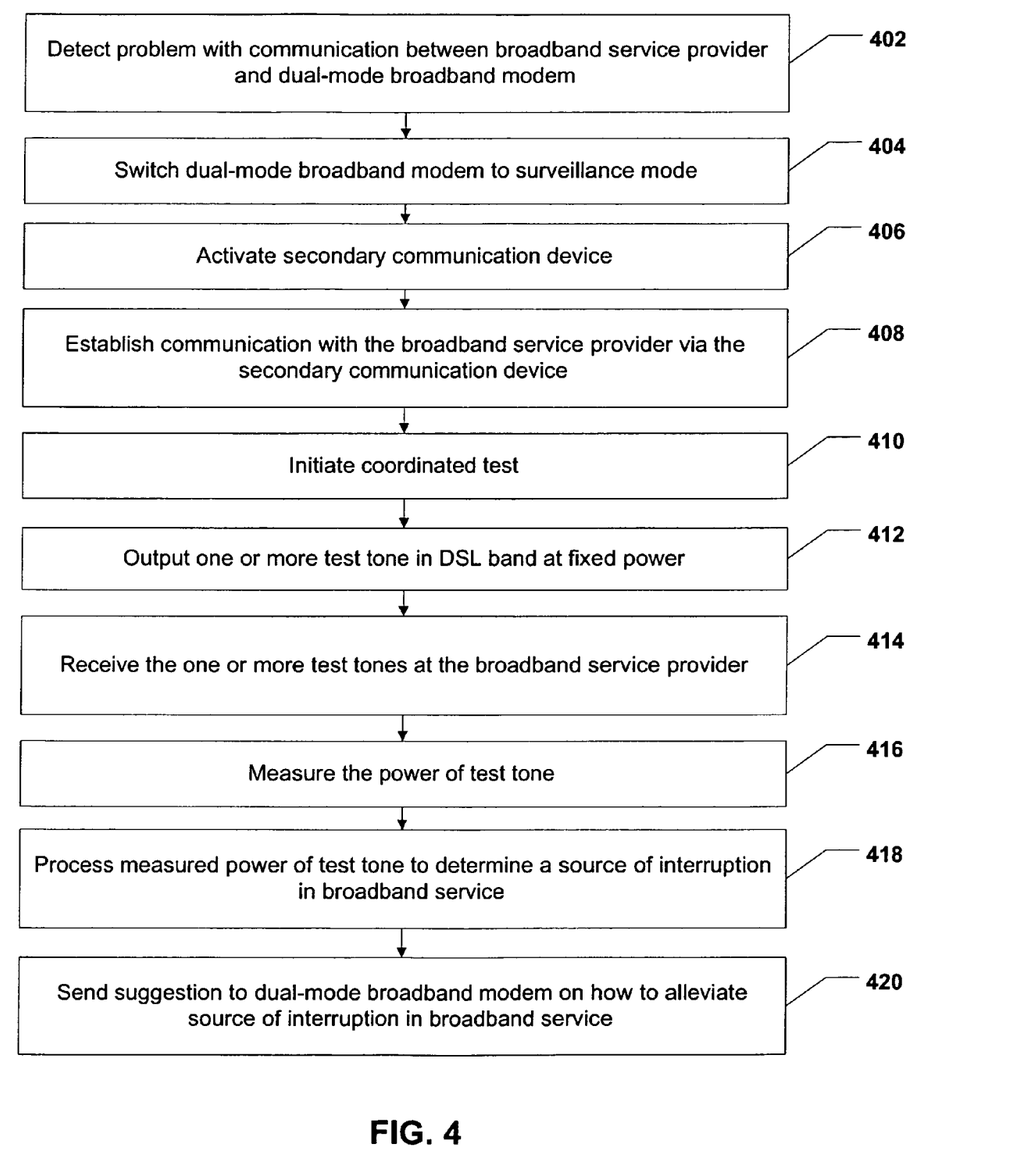
FIG. 4 is a flow chart of one embodiment of a method for performing a coordinated test between a dual-mode broadband modem and a broadband service provider.

Additionally, the dual-mode broadband modem may perform tests over broadband frequencies that are coordinated with the broadband service provider. These tests may be performed to verify a source of interruption in broadband service as evidenced in the historical information or may be performed independent of the historical information. FIG. 4 is a flow chart of one embodiment of a method for performing a coordinated test between a dual-mode broadband modem and a broadband service provider wherein the primary communication device is a DSL modem. The method begins with the central processing unit detecting a problem with communications between the dual-mode broadband modem and the broadband service provider 402. The central processing unit switches the dual-mode broadband modem from a service mode to a surveillance mode 404 and activates the secondary communication device 406.

The secondary communication device establishes communication with the broadband service provider 408 and a coordinated test is initiated 410. In response to initiation of the test via the secondary communication device, the central processing unit directs the primary communication device to output one or more test tones in the DSL band at a fixed power 412. The broadband service provider receives the one or more test tones 414 and measures the power of the test tones 416. The broadband service provider then processes the measured power of the test tones to determine a possible source of the interruption of broadband service 418 and automatically sends a suggestion to the dual-modem broadband modem regarding how to alleviate the source of the interruption in broadband service 420.

Figure 5:
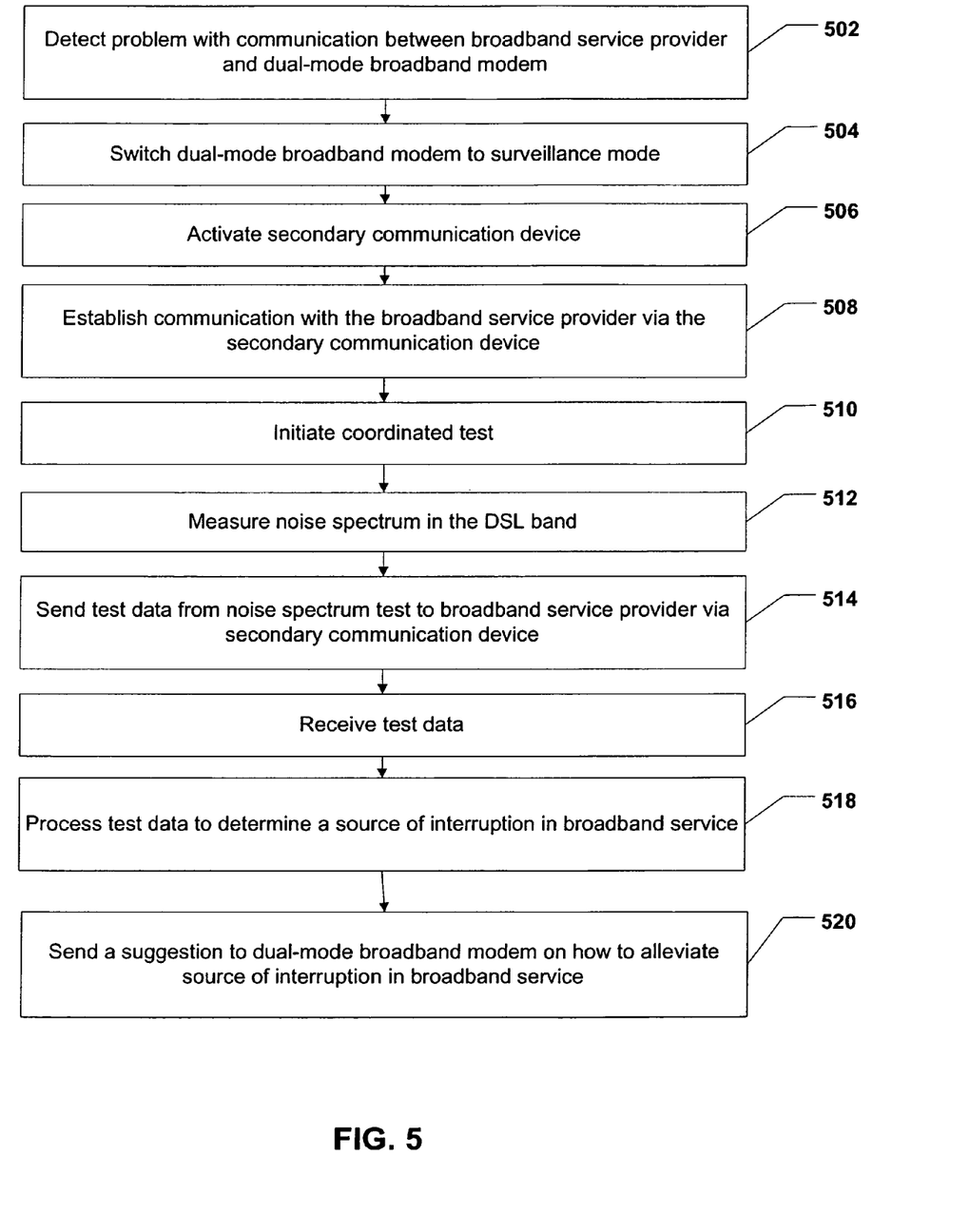
FIG. 5 is a flow chart of another embodiment of a method for performing a coordinated test between a dual-mode broadband modem and a broadband service provider.

FIG. 5 is a flow chart of another embodiment of a method for performing a coordinated test between a dual-mode broadband modem and a broadband service provider wherein the primary communication device is a DSL modem. The method begins with the central processing unit detecting a problem with communications between the dual-mode broadband modem and the broadband service provider 502. The central processing unit switches the dual-modem broadband modem from a service mode to a surveillance mode 504 and activates the secondary communication device 506.

The secondary communication device establishes communication with the broadband service provider 508 and a coordinated test is initiated 510. In response to initiation of the test via the secondary communication device, the central processing unit measures the noise spectrum in the broadband band via the primary communication device 512. The central processing unit then sends the test data from the noise spectrum to the broadband service provider via the secondary communication device 514. The broadband service provider receives the test data 516 and the broadband service provider processes the test data to determine a possible source of the interruption of broadband service 518. The broadband service provider then automatically sends a suggestion to the dual-mode broadband modem regarding how to alleviate the source of the interruption in broadband service 520.

Figure 6:
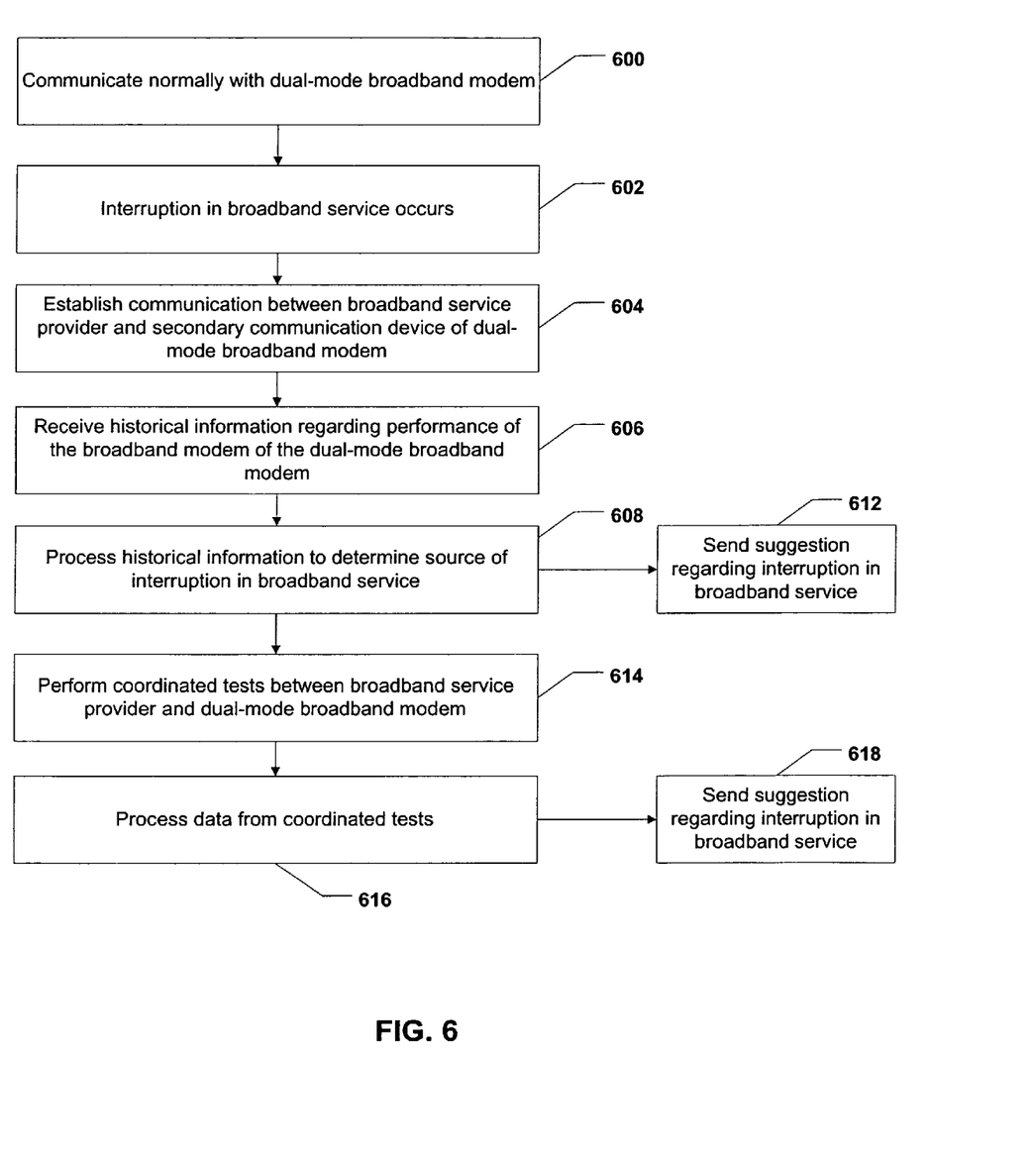
FIG. 6 is a flow chart of one embodiment of a method for operating a broadband service provider in communication with a dual-mode broadband modem to determine a source of an interruption in broadband service or a source of degraded performance of the dual-mode broadband modem.

FIG. 6 is a flow chart of one embodiment of a method for operating a broadband service provider in communication with a dual-mode broadband modem to determine a source of an interruption in broadband service or a source of degraded performance of the dual-band broadband modem. The method begins at step 600 with the broadband service provider communicating normally with a dual-mode broadband modem. An interruption in broadband service occurs, or the performance of the dual-mode broadband modem falls below a predetermined threshold 602, and communication is established between the broadband service provider and a secondary communication device of the dual-mode broadband modem 604. The broadband service provider receives historical information from the dual-mode broadband modem regarding historical performance of the broadband modem of the dual-mode broadband modem 606. The broadband service provider processes the historical information 608 looking for trends in the historical information. If a source of the interruption in broadband service is determined from the historical information, or the source of the degraded performance is determined from the historical information, the broadband service provider may automatically send a suggestion to the dual-mode broadband modem regarding how to alleviate the source of the interruption in broadband service or how to increase performance of the dual-band broadband modem 612. The broadband service provider may also perform coordinated tests between the broadband service provider and the dual-mode broadband modem 614 and process any resulting test data 616. If the test data evidences a source of the interruption in broadband service, or a source of the degraded performance, the broadband service provider may automatically send a suggestion to the dual-mode broadband modem regarding how to alleviate the source of the interruption in broadband service or how to increase performance of the dual-mode broadband modem 618.

Figure 7:
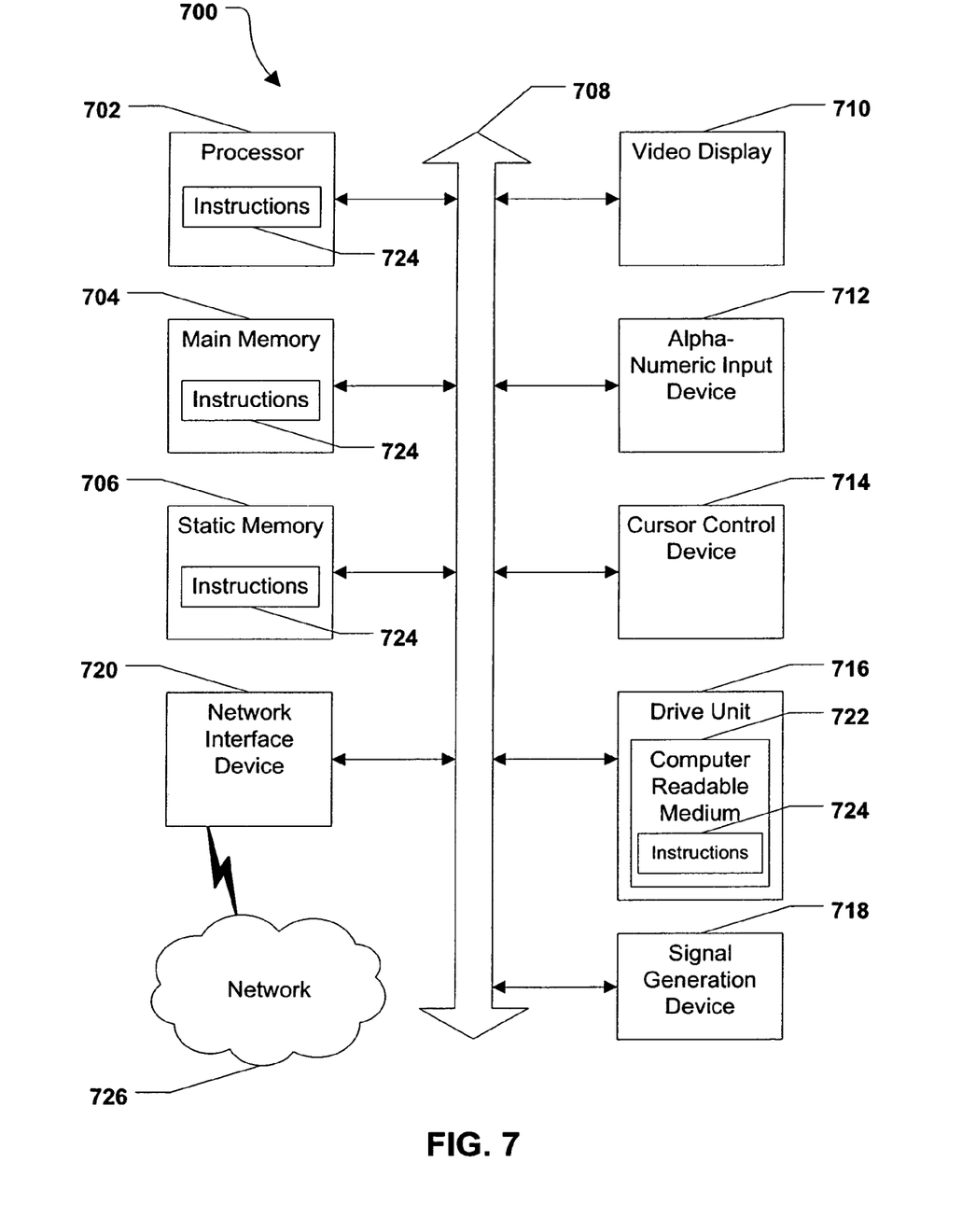
FIG. 7 is an illustrative embodiment of a general computer system.

Referring to FIG. 7, an illustrative embodiment of a general computer system is shown and is designated 700. The computer system 700 can include a set of instructions that can be executed to cause the computer system 700 to perform any one or more of the methods or computer based functions disclosed herein. The computer system 700 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), an organic light emitting diode (OLED), a flat panel display, a solid state display, or a cathode ray tube (CRT). Additionally, the computer system 700 may include an input device 712, such as a keyboard, and a cursor control device 714, such as a mouse. The computer system 700 can also include a disk drive unit 716, a signal generation device 718, such as a speaker or remote control, and a network interface device 720.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal, so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

The invention claimed is:

1. A dual-mode broadband modem operative to operate in a service mode and a surveillance mode, comprising:
   a primary communication device operative to communicate with at least a broadband service provider using a first network protocol;
   a secondary communication device operative to communicate with at least the broadband service provider using a second network protocol, the second network protocol different from the first network protocol;
   a central processing unit in communication with the primary and secondary communication devices, the central processing unit operative to switch the dual-mode broadband modem between the service mode and the surveillance mode; and
   a memory unit in communication with the central processing unit, the memory unit operative to store historical data relating to performance of the primary communication device;
   wherein the central processing unit activates the primary communication device and stores historical information regarding the performance of the primary communication device in the memory unit when the dual-mode broadband modem operates in service mode; and
   wherein the central processing unit activates at least the secondary communication device upon an interruption in broadband service between the primary communication device and the broadband service provider, and sends at least a portion of the historical information stored in the memory unit to the broadband service provider via the secondary communication device when the dual-mode broadband modem operates in surveillance mode for processing to determine a source of the interruption in broadband service between the primary communication device and the broadband service provider.

2. The dual-mode broadband modem of claim 1, wherein the central processing unit switches the dual-mode broadband modem from the service mode to the surveillance mode in response to detecting the interruption in broadband service.

3. The dual-mode broadband modem of claim 2, wherein the central processing unit detects the interruption in broadband service when the primary communication device cannot sync up with the broadband service provider.

4. The dual-mode broadband modem of claim 1, wherein the central processing unit switches the dual-mode broadband modem from the service mode to the surveillance mode in response to an instruction from a user.

5. The dual-mode broadband modem of claim 1, wherein the central processing unit switches the dual-mode broadband modem from the service mode to the surveillance mode in response to the performance of the primary communication device falling below a predetermined threshold.

6. The dual-mode broadband modem of claim 1, wherein the primary communication device is a digital subscriber line ("DSL") modem.

7. The dual-mode broadband modem of claim 1, wherein the primary communication device is a cable modem.

8. The dual-mode broadband modem of claim 1, wherein the primary communication device is an optical network termination ("ONT").

9. The dual-mode broadband modem of claim 1, wherein the secondary communication device is a voice-band modem.

10. The dual-mode broadband modem of claim 1, wherein the secondary communication device is a wireless communication device.

11. The dual-mode broadband modem of claim 1, wherein the central processing unit is operative to coordinate tests with the broadband service provider via the secondary communication device when the dual-mode broadband modem operates in surveillance mode.

12. The dual-mode broadband modem of claim 11, wherein the primary communication device is a DSL modem and the coordinated test is a double-ended DSL-band test.

13. The dual-mode broadband modem of claim 11, wherein the primary communication device is a DSL modem and the coordinated test is a test to measure wideband loss.

14. The dual-mode broadband modem of claim 11, wherein the primary communication device is a DSL modem and the coordinated test is a test to measure noise.

15. A method for determining a source of an interruption in broadband service, comprising:
communicating with a broadband service provider with a primary communication device of a dual-mode broadband modem using a first network protocol, the dual-mode broadband modem connected with at least one user device;
storing historical data relating to the performance of the primary communication device;
activating a secondary communication device of the dual-mode broadband modem upon an interruption in broadband service between the primary communication device and the broadband service provider; and
sending at least a portion of the historical data to the broadband service provider with the secondary communication device using a second network protocol, the first network protocol different form the second network protocol, upon activation of the secondary communication device for processing to determine a source of the interruption in broadband service between the primary communication device and the broadband service provider.

16. The method of claim 15, further comprising:
detecting the interruption in broadband service between the primary communication device and the broadband service provider;
wherein the secondary communication device is activated in response to detecting the interruption in broadband service between the primary communication device and the broadband service provider.

17. The method of claim 16, further comprising:
receiving a suggestion from the broadband service provider regarding how to alleviate the source of the interruption in broadband service based on the historical data.

18. The method of claim 15, further comprising:
coordinating a test regarding the primary communication device with the broadband service provider via the secondary communication device.

19. Computer-readable storage hardware containing a set of instructions for determining a source of an interruption in broadband service, the set of instructions to direct a processor to perform acts of:
communicating with a broadband service provider with a primary communication device of a dual-mode broadband modem using a first network protocol, the dual-mode broadband modem connected to at least one user device;
storing historical data relating to the performance of the primary communication device;
detecting an interruption in broadband service between the primary communication device and the broadband service provider;
activating a secondary communication device of the dual-mode broadband modem to communicate with the broadband service provider, using a second network protocol that is different from the first network protocol, upon the detection of the interruption in broadband service between the primary communication device and the broadband service provider; and
sending at least a portion of the historical data to the broadband service provider via the secondary communication device upon activation of the secondary communication device for processing to determine a source of the interruption in broadband service between the primary communication device and the broadband service provider.

20. The computer-readable storage hardware of claim 19, wherein the set of instructions further direct the computer system to perform the act of:
receiving a suggestion from the broadband service provider regarding how to alleviate the source of the interruption in broadband service based on the historical data.

21. The computer-readable storage hardware of claim 19, further comprising:
coordinating a test regarding the primary communication device with the broadband service provider via the secondary communication device.

22. A method for determining a source of an interruption in broadband service comprising:
communicating with a dual-mode broadband modem connected to at least one user device, via a primary communication device of the dual-mode broadband modem, using a first network protocol;
receiving historical data relating to performance of the primary communication device of the dual-mode broadband modem, via a secondary communication device of the dual-mode broadband modem, using a second network protocol that is different from the first network protocol, after an interruption in service between the primary communication device and a broadband service provider;
processing the historical data received via the secondary communication device to determine a source of the interruption in broadband service between the primary communication device and the broadband service provider; and
sending a suggestion to the dual-mode broadband modem via the secondary communication device regarding how to alleviate the source of the interruption in broadband service between the primary communication device and the broadband service provider.

23. Computer-readable storage hardware containing a set of instructions for determining a source of an interruption in broadband service, the set of instructions to direct a processor to perform acts of:
communicating with a dual-mode broadband modem connected to at least one user device, via a primary communication device of the dual-mode broadband modem, using a first network protocol;
receiving historical data relating to performance of the primary communication device of the dual-mode broadband modem, via a secondary communication device of the dual-mode broadband modem, using a second network protocol that is different from the second network protocol, after an interruption in service between the primary communication device and a broadband service provider;
processing the historical data received via the secondary communication device to determine a source of the interruption in broadband service between the primary communication device and the broadband service provider; and
sending a suggestion to the dual-mode broadband modem via the secondary communication device regarding how to alleviate the source of the interruption in broadband service between the primary communication device and the broadband service provider.

* * * * *